United States Patent
Iwata et al.

(10) Patent No.: US 9,862,863 B2
(45) Date of Patent: *Jan. 9, 2018

(54) POLISHING COMPOSITION AND METHOD FOR POLISHING MAGNETIC DISK SUBSTRATE

(71) Applicant: YAMAGUCHI SEIKEN KOGYO CO., LTD., Aichi (JP)

(72) Inventors: Toru Iwata, Aichi (JP); Akira Sugawa, Aichi (JP)

(73) Assignee: YAMAGUCHI SEIKEN KOGYO CO., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/278,351

(22) Filed: Sep. 28, 2016

(65) Prior Publication Data

US 2017/0015867 A1    Jan. 19, 2017

Related U.S. Application Data

(63) Continuation of application No. PCT/JP2015/058818, filed on Mar. 24, 2015.

(30) Foreign Application Priority Data

Mar. 28, 2014   (JP) ................. 2014-069343

(51) Int. Cl.

| | | |
|---|---|---|
| *C09G 1/02* | (2006.01) | |
| *B24B 37/04* | (2012.01) | |
| *G11B 5/84* | (2006.01) | |
| *C09K 3/14* | (2006.01) | |
| *C01B 33/14* | (2006.01) | |
| *C01B 33/146* | (2006.01) | |
| *C01B 33/18* | (2006.01) | |

(52) U.S. Cl.
CPC ............. *C09G 1/02* (2013.01); *B24B 37/042* (2013.01); *B24B 37/044* (2013.01); *C01B 33/14* (2013.01); *C01B 33/146* (2013.01); *C09K 3/1409* (2013.01); *C09K 3/1463* (2013.01); *G11B 5/8404* (2013.01); *C01B 33/18* (2013.01); *C01P 2004/62* (2013.01); *C01P 2004/64* (2013.01)

(58) Field of Classification Search
CPC ..... B24B 37/042; B24B 37/044; C01B 33/14; C01B 33/146; C01B 33/18; C01G 1/02; C01P 2004/62; C01P 2004/64; C09K 3/1409; C09K 3/1463; G11B 5/8404
See application file for complete search history.

(56) References Cited

U.S. PATENT DOCUMENTS

| | | |
|---|---|---|
| 6,261,476 B1 | 7/2001 | Kwok et al. |
| 6,319,096 B1 | 11/2001 | Mueller et al. |
| 6,478,835 B2 | 11/2002 | Miyata et al. |
| 6,656,241 B1 | 12/2003 | Hellring et al. |
| 8,247,326 B2 | 8/2012 | Balasubramaniam et al. |
| 8,372,378 B2 * | 2/2013 | Mueller .................. C01B 37/02 423/325 |
| 8,404,009 B2 | 3/2013 | Suzuki et al. |
| 8,827,769 B2 | 9/2014 | Nakanishi et al. |
| 9,358,659 B2 * | 6/2016 | Lau .......... B24B 37/044 |
| 2002/0002797 A1 | 1/2002 | Miyata et al. |
| 2004/0221516 A1 | 11/2004 | Cho et al. |
| 2007/0094936 A1 | 5/2007 | Cho et al. |
| 2008/0237535 A1 * | 10/2008 | Maejima .................. C09G 1/02 252/79.1 |
| 2009/0111359 A1 | 4/2009 | Suzuki et al. |
| 2011/0009537 A1 | 1/2011 | Kotera et al. |
| 2011/0203186 A1 | 8/2011 | Oshima et al. |
| 2012/0045974 A1 | 2/2012 | Nakanishi et al. |
| 2014/0191155 A1 * | 7/2014 | Reiss ....................... C09G 1/02 252/79.5 |
| 2014/0335763 A1 | 11/2014 | Oshima et al. |

FOREIGN PATENT DOCUMENTS

| | | |
|---|---|---|
| JP | 2001-207161 A | 7/2001 |
| JP | 2001-260005 A | 9/2001 |
| JP | 2003-514950 A | 4/2003 |
| JP | 2004-331479 A | 11/2004 |
| JP | 2004-331852 A | 11/2004 |
| JP | 2004-534396 A | 11/2004 |
| JP | 2009-176397 A | 8/2009 |
| JP | 2010-167553 A | 8/2010 |
| JP | 2011-204327 A | 10/2011 |
| JP | 2011-527643 A | 11/2011 |
| JP | 2012-043493 A | 3/2012 |
| JP | 2012-155785 A | 8/2012 |
| JP | 2014-029755 A | 12/2012 |
| JP | 2014-029754 A | 2/2014 |

OTHER PUBLICATIONS

PCT/JP2015/058818 International Search Report dated Jun. 9, 2015; 4 pgs.

* cited by examiner

*Primary Examiner* — Timothy V Eley
(74) *Attorney, Agent, or Firm* — Bracewell LLP; Brad Y. Chin

(57) ABSTRACT

Embodiments of the invention provide a polishing composition including colloidal silica having an average particle size of 5 to 200 nm and pulverized wet-process silica particles having an average particle size of 0.1 to 1.0 μm, wherein a value of the ratio of the average particle size of the wet-process silica particles to that of the colloidal silica is from 2.0 to 30.0. The polishing composition, according to various embodiments, achieves a high polishing rate and has a good surface smoothness, without the use of alumina particles.

3 Claims, No Drawings

POLISHING COMPOSITION AND METHOD FOR POLISHING MAGNETIC DISK SUBSTRATE

CROSS REFERENCE TO RELATED APPLICATIONS

This application claims the benefit of and priority under 35 U.S.C. §119 to PCT Patent Application No. PCT/JP2015/058818, entitled, "POLISHING AGENT COMPOSITION AND METHOD FOR POLISHING MAGNETIC DISK SUBSTRATE," filed on Mar. 24, 2015, which claims priority to Japanese Patent Application No. JP 2014-069343, entitled, "POLISHING AGENT COMPOSITION AND METHOD FOR POLISHING MAGNETIC DISK SUBSTRATE," filed on Mar. 28, 2014, which are hereby incorporated by reference in their entirety into this application.

BACKGROUND

Field

Embodiments of the invention relate to a polishing composition used for polishing electronic components, such as semiconductors and magnetic recording media including hard disks. Particularly, embodiments of the invention relate to a polishing composition used for surface polishing of a substrate for a magnetic recording medium, such as a glass magnetic disk substrate and an aluminum magnetic disk substrate. Further, embodiments of the invention relate to a polishing composition used for surface polishing of an aluminum magnetic disk substrate for a magnetic recording medium, wherein the substrate has a coating formed by electroless nickel-phosphorus plating on the surface of a substrate of an aluminum alloy.

Description of the Related Art

In the past, use has been made of polishing compositions in which alumina particles with relatively large particle sizes which can provide a high polishing rate are dispersed in water from the viewpoint of productivity, as a polishing composition for polishing a surface coated by electroless nickel-phosphorus plating, of an aluminum magnetic disk substrate. However, the use of alumina particles has caused a problem that since alumina particles are considerably harder than a coating deposited by electroless nickel-phosphorus plating on an aluminum magnetic disk substrate, alumina particles are embedded in the substrate and the embedded particles have an adverse effect on the subsequent polishing step.

As solutions to this problem, polishing compositions have been proposed in which alumina particles and silica particles are combined. There have also been proposed methods in which polishing is performed, with no use of alumina particles, using only silica particles.

According to the conventional art, it is possible that by combining alumina particles and silica particles, the alumina particles that are embedded in the substrate are removed to some degree. However, as long as a polishing composition including alumina particles is used, there still remains the possibility that the alumina particles contained in the polishing composition are embedded in the substrate. In addition, since the proposed polishing compositions include both alumina particles and silica particles, there is caused a problem that the respective properties possessed by the alumina particles and by the silica particles are negated with each other, leading to worsening of the polishing rate and surface smoothness.

For these reasons, there have been proposed methods in which polishing is performed, with no use of alumina particles, using only silica particles. According to the conventional art, it is proposed to combine colloidal silica and a polishing accelerator. According to other conventional art, methods are proposed in which polishing is performed using colloidal silica, as well as fumed silica, surface modified silica, silica produced in water glass process, and other types of silica, in particular colloidal silica having particular shapes. However, these methods do not achieve a sufficient polishing rate, and are required to make improvements. According to other conventional art, a method is proposed in which colloidal silica and fumed silica are used in combination. However, while this method results in an improvement in the polishing rate, the fumed silica has very low bulk density, leading to significant worsening of workability, such as in the preparation of slurries, and also having concerns about health due to its dusts. According to other conventional art, a method is proposed in which crushed silica particles are used, thereby to obtain a polishing rate approximate to that obtained when alumina particles are used. However, this method has a problem of worsening the surface smoothness, and is required to make improvements.

SUMMARY

Embodiments of the invention has been made in light of problems caused by the conventional art discussed above, and provide a polishing composition making it possible to achieve a high polishing rate and to obtain a good surface smoothness without the use of alumina particles.

Embodiments of the invention demonstrate that by combining colloidal silica having particular particle size and wet-process silica particles having particular particle size which are formed through a pulverization step, it is possible to achieve a higher polishing rate and a better surface smoothness than expected when particles of the respective silica are used alone.

Therefore, according to various embodiment of the invention, there is provided a polishing composition as described below.

According to at least one embodiment, there is provided a polishing composition including colloidal silica having an average particle size of 5 to 200 nm and pulverized wet-process silica particles having an average particle size of 0.1 to 1.0 μm, wherein a value of the ratio of the average particle size of the wet-process silica particles to that of the colloidal silica is from 2.0 to 30.0.

According to at least one embodiment, a total concentration of the colloidal silica and the wet-process silica particles is 1 to 50 mass %, wherein the colloidal silica accounts for 5 to 95 mass % and the wet-process silica particles account for 5 to 95 mass %, of the whole of the colloidal silica and the wet-process silica particles.

According to at least one embodiment, the composition is an aqueous composition further including an acid and an oxidizing agent, wherein a pH value is 0.1 to 4.0.

According to at least one embodiment, the composition is used for polishing an aluminum magnetic disk substrate that is plated with electroless nickel-phosphorus.

According to at least one embodiment, a magnetic disk substrate is polished using the polishing composition according to various embodiments of the invention.

Embodiments of the invention make it possible that in polishing the surface of an aluminum magnetic disk substrate for a magnetic recording medium on which a coating has been formed by electroless nickel-phosphorus plating on the surface of a substrate of an aluminum alloy, particles of two types of silica are used in combination, thereby achieving a higher polishing rate, while obtaining a better surface smoothness, relative to when particles of the respective types of silica are used alone.

DETAILED DESCRIPTION

These and other features, aspects, and advantages of the invention are better understood with regard to the following Detailed Description, appended Claims, and accompanying FIGURE. It is to be noted, however, that the FIGURE illustrates only various embodiments of the invention and are therefore not to be considered limiting of the invention's scope as it may include other effective embodiments as well.

1. Polishing Compositions

A polishing composition, according to at least one embodiment, is an aqueous composition including at least colloidal silica and wet-process silica particles. The colloidal silica has an average particle size of 5 to 200 nm, and the wet-process silica particles have an average particle size of 0.1 to 1.0 μm. The value of the ratio (B/A) of the average particle size of the wet-process silica particles (B) to that of the colloidal silica (A) is from 2.0 to 30.0. According to at least one embodiment, the wet-process silica particles are cracked silica obtained by pulverization in their production process. Thus, the process for producing the wet-process silica particles includes a pulverization step.

A polishing composition, according to at least one embodiment, contains a certain type of colloidal silica and a certain type of wet-process silica particles such that the average particle sizes of both types of silica have a particular relationship, thereby achieving a high polishing rate and at the same time, a good surface smoothness, which are beyond expectation, compared to when particles of the respective types of silica are used alone. In general, when particles of large particle sizes (the wet-process silica particles according to at least one embodiment) and particles of small particle sizes (the colloidal silica according to at least one embodiment) are used in combination in the polishing composition, there is a tendency that the polishing rate and the surface smoothness achieved by using such polishing composition are dominated by those provided by the particles of large particle sizes. This means that in general, the polishing rate achieved by using a polishing composition including particles of large particle sizes and particles of small particle sizes does not significantly exceed the rate provided by the particles of large particle sizes, and the surface smoothness achieved by using the polishing composition is equal to the smoothness provided by the particles of large particle sizes and the smoothness is inferior to that of provided by the particles of small particle sizes. In contrast, the polishing composition, according to at least one embodiment, has a significantly higher polishing rate, relative to when either the colloidal silica or the wet-process silica particles are used alone, and retains a good surface smoothness. It can be said that these effects are remarkable in that they cannot be expected from conventional, common general technical knowledge.

The polishing composition, according to at least one embodiment, will be described below in more detail. In the following description, when there is described simply as a "polishing composition," it refers to a polishing composition of the present invention, unless otherwise specified. Also in the following description, when there is described simply as "colloidal silica" or "wet-process silica particles," it refers to colloidal silica or wet-process silica particles for use in the present invention, respectively, unless otherwise specified.

1-1. Colloidal Silica

The colloidal silica that is contained in a polishing composition, according to at least one embodiment, has an average particle size of 5 to 200 nm. Average particle sizes equal to or above 5 nm make it possible to prevent the polishing rate from decreasing. Average particle sizes of colloidal silica equal to or below 200 nm make it possible to prevent the surface smoothness from worsening. The average particle size of colloidal silica is preferably 5 to 150 nm, more preferably 30 to 100 μm. The average particle sizes in the present application refer to a median diameter (D50).

Colloidal silica is known in various shapes, for example, in spherical, chain-like, kompeito-typed (like particles having convexes on the surface), heteromorphic, and other shapes, and forms colloid in which primary silica particles are monodispersed in water. The colloidal silica for use in the present invention particularly preferably is of a spherical or nearly spherical shape. The use of colloidal silica that is of a spherical or nearly spherical shape allows a further improvement in the surface smoothness. Colloidal silica is obtained, for example, by water glass process in which sodium or potassium silicates are used as a raw material, and by methods in which an alkoxysilane such as tetraethoxysilane is hydrolyzed with an acid or with an alkali.

1-2. Wet-Process Silica Particles

The wet-process silica particles, according to at least one embodiment, refer to particles prepared from wet-process silica obtained as precipitated silicic acid by adding an aqueous alkali silicate solution and an inorganic acid or an aqueous solution of an inorganic acid into a reaction vessel, and do not include the colloidal silica described above.

The aqueous alkali silicate solution that is used as a raw material for wet-process silica is an aqueous sodium silicate solution, an aqueous potassium silicate solution, an aqueous lithium silicate solution, and others. In general, an aqueous sodium silicate solution is preferably used. The inorganic acid can be sulfuric acid, hydrochloric acid, nitric acid, and others. In general, sulfuric acid is preferably used. After the completion of the reaction, the reaction solution is filtered, and washed with water and then dried in a dryer so as to have a water content of 6% or lower. The dryer can be any of a stationary dryer, a spray dryer, and a fluidized dryer. Subsequently, the dried material is pulverized in a pulverizer such as a jet mill, followed by classification to obtain wet-process silica particles.

According to at least one embodiment, the wet-process silica particles having been cracked by pulverization in this way are of angular shapes and have a higher degree of polishing ability than that of nearly spherical particles.

According to at least one embodiment, the wet-process silica particles has an average particle size of 0.1 to 1.0 μm, preferably 0.2 to 1.0 μm, more preferably 0.2 to 0.6 μm. Average particle size of wet-process silica particles equal to or above 0.1 μm make it possible to prevent the polishing rate from decreasing. Average particle sizes of wet-process silica particles equal to or below 1.0 μm make it possible to prevent the surface smoothness from worsening.

According to at least one embodiment, a value of the ratio (B/A) between the average particle sizes of the wet-process silica particles (B) and the colloidal silica (A) is from 2.0 to 30.0, preferably from 2.0 to 16.0, more preferably from 3.0 to 16.0, further preferably from 3.0 to 10.0, particularly preferably from 4.0 to 10.0. Ratios of the average particle sizes equal to or above 2.0 make it possible to improve the polishing rate. Ratios of the average particle sizes equal to or below 30.0 make it possible to prevent the surface smoothness from worsening.

According to at least one embodiment, a total concentration of the colloidal silica and the wet-process silica particles is preferably 1 to 50 mass %, more preferably 2 to 40 mass %, in the whole polishing composition. Total concentrations of the two types of silica particles equal to or above 1 mass % make it possible to prevent the polishing rate from decreasing. Total concentrations of the two types of silica particles equal to or below 50 mass % make it possible to retain a sufficient polishing rate without using excessive silica particles.

According to at least one embodiment, the colloidal silica preferably accounts for 5 to 95 mass %, more preferably 20 to 80 mass %, of the whole of the silica particles. Percentages of the colloidal silica equal to or above 5 mass % make it possible to prevent the surface smoothness from worsening. Percentages of the colloidal silica equal to or below 95 mass % make it possible to prevent the polishing rate from decreasing.

According to at least one embodiment, the wet-process silica particles preferably account for 5 to 95 mass %, more preferably 20 to 80 mass %, of the whole of the silica particles. Percentages of the wet-process silica particles equal to or below 95 mass % make it possible to prevent the surface smoothness from worsening. Percentages of the wet-process silica particles equal to or above 5 mass % make it possible to prevent the polishing rate from decreasing.

1-3. Other Components

In addition to the colloidal silica and the wet-process silica particles, the polishing composition, according to at least one embodiment, can include other particles, as particles contained in the polishing composition. In this case, it is particularly preferable that the polishing composition does not include alumina particles from the viewpoint of reducing embedding of them in a substrate to be polished.

According to at least one embodiment, the polishing composition preferably includes an acid, in addition to the silica particles. The acid may be an acid and/or a salt thereof. Specific examples of the acid include inorganic acids such as nitric acid, sulfuric acid, hydrochloric acid, phosphoric acid, phosphonic acid, phosphinic acid, pyrophosphoric acid, and tripolyphosphoric acid; organic phosphonic acids such as 2-aminoethylphosphonic acid, 1-hydroxyethyliden-1,1-diphosphonic acid, aminotri (methylenephosphonic acid), ethylene diamine tetra (methylenephosphonic acid), diethylene triamine (methylenephosphonic acid), ethane-1,1-diphosphonic acid, and methane hydroxyphosphonic acid; aminocarboxylic acids such as glutamic acid and aspartic acid; and carboxylic acids such as citric acid, tartaric acid, oxalic acid, nitroacetic acid, and maleic acid. Counterions in cases of using these acids are not limited in particular, and specific examples of these counterions include, for example, metal, ammonium and alkylammonium ions.

According to at least one embodiment, the polishing composition preferably includes an oxidizing agent, in addition to the silica particles. The oxidizing agent includes, for example, peroxides, permanganic acid or salts thereof, and chromic acid or salts thereof. Specific examples of the oxidizing agent include, for example, hydrogen peroxide, sodium peroxide, barium peroxide, and potassium permanganate. Among them, preference is given to hydrogen peroxide.

According to at least one embodiment, the polishing composition may include a water-soluble polymer compound, fungicides, microbicides, and others.

1-4. Physical Properties

According to at least one embodiment, the polishing composition preferably has a pH value of 0.1 to 4.0, more preferably 0.5 to 3.0. The pH values of the polishing composition equal to or above 0.1 make it possible to prevent the surface smoothness from worsening. The pH values of the polishing composition equal to or below 4.0 make it possible to prevent the polishing rate from decreasing.

According to at least one embodiment, the polishing composition can be used for polishing various electronic components such as semiconductors and magnetic recording media including hard disks. In particular, the polishing composition is suitably employed for polishing an aluminum magnetic disk substrate of an aluminum alloy. Further suitably, the polishing composition can be employed for polishing an aluminum magnetic disk substrate which is plated with electroless nickel-phosphorus. The electroless nickel-phosphorus plating is usually performed under conditions where the pH is 4 to 6. Conditions with the pH of not higher than 4 have a tendency for nickel to dissolve, and thus it is difficult that the plating takes place. In polishing, on the other hand, nickel has a tendency toward dissolution, for example, under conditions with the pH of not higher than 4.0, and thus the use of the polishing composition of the present invention can result in an increase in the polishing rate.

2. Methods for Polishing Magnetic Disk Substrates

According to at least one embodiment, the polishing composition is suitable for polishing magnetic disk substrates, such as an aluminum magnetic disk substrate which has been subjected to electroless nickel-phosphorus plating (hereinafter referred to as an aluminum disk), and a glass magnetic disk substrate. In particular, the polishing composition is suitable for use in polishing an aluminum disk. Therefore, the present invention is directed to a method for polishing a magnetic disk substrate wherein the magnetic disk substrate is polished using the above-described polishing composition. The polishing composition can also be used for polishing semiconductor substrates, for example, of silicon carbide, silicon, germanium, gallium arsenide, gallium phosphide, indium phosphide, and gallium nitride; single crystal substrates, for example, of sapphire, lithium tantalate, and lithium niobate; magnetic heads, and others.

Polishing methods in which the polishing composition, according to at least one embodiment, can be applied include, for example, a method (called polishing) in which a polishing pad is attached to a surface plate of a polishing machine, a polishing composition is fed onto a surface to be polished of a polishing object (for example, an aluminum disk) or onto the polishing pad, and the surface to be polished is rubbed with the polishing pad. For example, when the front- and back-side surfaces of an aluminum disk are polished at a time, a method is used in which use is made of a double side polishing machine provided with an upper surface plate and a lower surface plate to each of which a polishing pad has been attached. In this method, the front- and back-side surfaces of the aluminum disk are polished by sandwiching the aluminum disk between the polishing pads which each have been attached to the upper and lower surface plates, feeding the polishing composition between the surface to be polished and the polishing pad, and concurrently rotating these two polishing pads.

For the polishing pad, use can be made of ones of polyurethane type, suede type, non-woven fabric type, and any other type.

EXAMPLES

Various embodiments of the invention will be described below in a specific manner based on Examples which follow, but it goes without saying that these Examples are not intended to limit the present invention, which can be carried out in various embodiments, as long as they fall within the technical scope of the present invention.

(1) Methods for Preparing Polishing Compositions

Examples 1 to 5 and Comparative Examples 1 to 2

The polishing compositions used in Examples 1 to 5 and Comparative Examples 1 to 2 were ones including the following materials.

[Colloidal Silica 1] (commercially available colloidal silica, having an average particle size (D50) of 51 nm on a cumulative volume basis. Its contents in these polishing compositions are indicated in Table 1. The colloidal silica was not contained in Comparative Example 2.)

[Wet-Process Silica 1] (commercially available wet-process silica particles, having an average particle size (D50) of 0.3 μm. Its contents in these polishing compositions are indicated in Table 1. The wet-process silica particles were not contained in Comparative Example 1.)

[Sulfuric Acid] 1.9 mass % (adjustment was made to this concentration in all Examples and Comparative Examples.)

[Hydrogen Peroxide] 1.2 mass % (adjustment was made to this concentration in all Examples and Comparative Examples.)

Examples 6 to 10 and Comparative Example 3

In Examples 6 to 10 and Comparative Example 3, wet-process silica 2 (having an average particle size (D50) of 0.4 μm) was used instead of the wet-process silica 1. Its contents in these polishing compositions are indicated in Table 1.

As the colloidal silica, use was made of colloidal silica 1. Its contents in these polishing compositions are indicated in Table 1. The colloidal silica was not contained in Comparative Example 3.

[Sulfuric Acid] 1.9 mass % (adjustment was made to this concentration in all Examples and Comparative Examples.)

[Hydrogen Peroxide] 1.2 mass % (adjustment was made to this concentration in all Examples and Comparative Examples.)

Examples 11 to 15 and Comparative Example 4

In Examples 11 to 15 and Comparative Example 4, wet-process silica 3 (having an average particle size (D50) of 0.8 μm) was used instead of the wet-process silica 1. Its contents in these polishing compositions are indicated in Table 2.

As the colloidal silica, use was made of colloidal silica 1. Its contents in these polishing compositions are indicated in Table 2. The colloidal silica was not contained in Comparative Example 4.

[Sulfuric Acid] 1.9 mass % (adjustment was made to this concentration in all Examples and Comparative Examples.)

[Hydrogen Peroxide] 1.2 mass % (adjustment was made to this concentration in all Examples and Comparative Examples.)

Examples 16 to 20 and Comparative Example 5

In Examples 16 to 20 and Comparative Example 5, colloidal silica 2 (having an average particle size (D50) of 10 nm on a cumulative volume basis) was used instead of the colloidal silica 1. Its contents in these polishing compositions are indicated in Table 2.

The wet-process silica particles used were of wet-process silica 1. Its contents in these polishing compositions are indicated in Table 2. The wet-process silica particles were not contained in Comparative Example 5.

[Sulfuric Acid] 1.9 mass % (adjustment was made to this concentration in all Examples and Comparative Examples.)

[Hydrogen Peroxide] 1.2 mass % (adjustment was made to this concentration in all Examples and Comparative Examples.)

Example 21

Example 21 used particles of three types of silica: colloidal silica 1, colloidal silica 3 (having an average particle size (D50) of 112 nm on a cumulative volume basis), and wet-process silica 1. Their contents in the polishing composition are indicated in Table 2; the ratio of the contents of the colloidal silicas 1 and 3 was 64:22, and the overall average particle size (D50) of the whole of the colloidal silicas 1 and 3 was 63 nm on a cumulative volume basis.

[Sulfuric Acid] 1.9 mass %

[Hydrogen Peroxide] 1.2 mass %

The particle diameter of colloidal silica was determined as a Heywood diameter (projected area equivalent circular diameter) by taking photographs of fields of view at a magnification of ×100000 under a transmission electron microscope (TEM) (e.g., transmission electron microscope JEM 2000FX (200 kV), manufactured by JEOL Ltd.) and analyzing these photographs with an analysis software (Mac-View Ver. 4.0, manufactured by Mountech CO., Ltd.). The average particle size of colloidal silica is an average particle size (D50) when the particle diameters of about 2000 particles of colloidal silica were analyzed as described above and the particle size at which the cumulative particle size distribution (on a cumulative volume basis) from a smaller particle size reaches 50% is calculated using art above-mentioned analysis software (e.g., Mac-View Ver. 4.0, manufactured by Mountech CO., Ltd.).

The average particle size of wet-process silica particles was determined using a dynamic light scattering particle size distribution analyzer (e.g., Microtrac UPA, manufactured by NIKKISO CO., Ltd.) for particles having particle sizes of not more than 0.4 μm, and a laser diffraction particle size distribution analyzer (e.g., SALD 2200, manufactured by SHIMADZU CORPORATION) for particles having particle sizes of more than 0.4 μm. The average particle size of wet-process silica particles is an average particle size (D50) at which the cumulative particle size distribution on a volume basis from a smaller particle size reaches 50%.

(2) Polishing Conditions

Aluminum disks with an outer diameter of 95 mm that is plated with electroless nickel-phosphorus were used as a substrate to be polished, and polishing was performed under the following polishing conditions.

Polishing Machine: 9B double-side polishing machine, manufactured by System Seiko Co., Ltd.

Polishing Pad: P1 pads, manufactured by FILWEL Co., Ltd.

Surface Plate Rotating Speed: upper surface plate: −13.0 min$^{-1}$

Lower Surface Plate: 16.0 min$^{-1}$

Feed of Polishing Composition: 70 ml/min

Polishing Time: polishing was performed up to the time when the amount of polishing reached 1.2 to 1.5 μm per one side. (130 to 1500 seconds)

Processing Pressure: 120 kPa (3) Assessment of Polished Disk Surfaces (3-1) Polishing Rate Ratios The polishing rate was calculated by measuring the decreased mass of a polished aluminum disk, according to the following formula:

Polishing rate (μm/min)=decreased mass of a polished aluminum disk (g)/polishing time (min)/area of one side of the aluminum disk (cm$^2$)/density of the coating by electroless nickel-phosphorus plating (g/cm$^3$)/2×104, wherein the area of one side of the aluminum disk was 65.9 cm$^2$ and the density of the coating by electroless nickel-phosphorus plating was 8.0 g/cm$^3$.

The polishing rate ratio is a relative value when the polishing rate for Comparative Example 1 which was determined using the above formula is 1. The polishing rate for Comparative Example 1 was 0.131 μm/min.

(3-2) Pits

Pits were measured under a three-dimensional surface structure analyzing microscope using scanning white-light interferometry, manufactured by Zygo Corp. The measurement was made using a measurement apparatus manufactured by Zygo Corp. (e.g., New View 5032 with a lens of an ×2.5 magnification and a zoom of 0.5 times) and a analysis software, manufactured by Zygo Corp. (Metro Pro). The observed shape profiles were evaluated as "good" for profiles having few pits and "failure" for profiles having pits. When there were many pits, they were also visually observed.

(3-3) Surface Roughness (Zygo-Ra)

The surface roughness of aluminum disks (Ra) was determined under a three-dimensional surface structure analyzing microscope using scanning white-light interferometry, manufactured by Zygo Corp. (hereinafter, the surface roughness determined by this method is referred to as a "Zygo-Ra"). The determination was made under conditions where a measurement apparatus, manufactured by Zygo Corp. (e.g., New View 5032 with a lens of a ×2.5 magnification and a zoom of 0.5 times) and a analysis software, manufactured by Zygo Corp. (Metro Pro) were used, the filter had an FFT Fixed Pass wavelength set to be 0.00 to 0.08 mm, and the measurement area was 5.68×4.26 mm. In the tables, the surface roughness being rated as "not measurable" indicates a state where there are pits and the surface roughness cannot be determined by the above-described method.

TABLE 1

| | Colloidal silica | | Wet-process silica particles | | | | Colloidal silica: | | | | |
| | Type | Average particle size D50 (nm) | Type | Average particle size D50 (μm) | Total silica concentration (wt %) | Particle size ratio | wet-process silica particles (mass ratio) | pH | Polishing rate ratio | Pits | Surface roughness Zygo-Ra (Å) |
|---|---|---|---|---|---|---|---|---|---|---|---|
| Comparative Example 1 | Colloidal silica 1 | 51 | none | — | 6 | 5.9 | 10:0 | 1.2 | 1 | good | 1.37 |
| Example 1 | Colloidal silica 1 | 51 | Wet-process silica 1 | 0.3 | 6 | | 9:1 | 1.2 | 1.16 | good | 1.52 |
| Example 2 | Colloidal silica 1 | 51 | Wet-process silica 1 | 0.3 | 6 | | 7:3 | 1.2 | 1.43 | good | 1.74 |
| Example 3 | Colloidal silica 1 | 51 | Wet-process silica 1 | 0.3 | 6 | | 5:5 | 1.2 | 1.66 | good | 1.95 |
| Example 4 | Colloidal silica 1 | 51 | Wet-process silica 1 | 0.3 | 6 | | 3:7 | 1.2 | 1.97 | good | 2.00 |
| Example 5 | Colloidal silica 1 | 51 | Wet-process silica 1 | 0.3 | 6 | | 1:9 | 1.2 | 2.05 | good | 2.23 |
| Comparative Example 2 | none | — | Wet-process silica 1 | 0.3 | 6 | | 0:10 | 1.2 | 1.26 | failure | not measurable |
| Comparative Example 1 | Colloidal silica 1 | 51 | none | — | 6 | 7.8 | 10:0 | 1.2 | 1 | good | 1.37 |
| Example 6 | Colloidal silica 1 | 51 | Wet-process silica 2 | 0.4 | 6 | | 9:1 | 1.2 | 1.35 | good | 2.18 |
| Example 7 | Colloidal silica 1 | 51 | Wet-process silica 2 | 0.4 | 6 | | 7:3 | 1.2 | 1.78 | good | 2.74 |
| Example 8 | Colloidal silica 1 | 51 | Wet-process silica 2 | 0.4 | 6 | | 5:5 | 1.2 | 2.14 | good | 3.08 |
| ample 9 | Colloidal silica 1 | 51 | Wet-process silica 2 | 0.4 | 6 | | 3:7 | 1.2 | 2.43 | good | 3.52 |
| Example 10 | Colloidal silica 1 | 51 | Wet-process silica 2 | 0.4 | 6 | | 1:9 | 1.2 | 2.33 | good | 4.63 |
| Comparative Example 3 | none | — | Wet-process silica 2 | 0.4 | 6 | | 0:10 | 1.2 | 1.89 | failure | not measurable |

TABLE 2

| | Colloidal silica | | Wet-process silica particles | | | | Colloidal silica: | | | | |
| | Type | Average particle size D50 (nm) | Type | Average particle size D50 (μm) | Total silica concentration (wt %) | Particle size ratio | wet-process silica particles (mass ratio) | pH | Polishing rate ratio | Pits | Surface roughness Zygo-Ra (Å) |
|---|---|---|---|---|---|---|---|---|---|---|---|
| Comparative Example 1 | Colloidal silica 1 | 51 | none | — | 6 | 15.7 | 10:0 | 1.2 | 1 | good | 1.37 |

TABLE 2-continued

|  | Colloidal silica | | Wet-process silica particles | | | | | | | | |
|---|---|---|---|---|---|---|---|---|---|---|---|
|  | Type | Average particle size D50 (nm) | Type | Average particle size D50 (μm) | Total silica concentration (wt %) | Particle size ratio | Colloidal silica: wet-process silica particles (mass ratio) | pH | Polishing rate ratio | Pits | Surface roughness Zygo-Ra (Å) |
| Example 11 | Colloidal silica 1 | 51 | Wet-process silica 3 | 0.8 | 6 |  | 9:1 | 1.2 | 1.88 | good | 5.83 |
| Example 12 | Colloidal silica 1 | 51 | Wet-process silica 3 | 0.8 | 6 |  | 7:3 | 1.2 | 2.79 | good | 7.48 |
| Example 13 | Colloidal silica 1 | 51 | Wet-process silica 3 | 0.8 | 6 |  | 5:5 | 1.2 | 3.65 | good | 8.53 |
| Example 14 | Colloidal silica 1 | 51 | Wet-process silica 3 | 0.8 | 6 |  | 3:7 | 1.2 | 4.28 | good | 9.22 |
| Example 15 | Colloidal silica 1 | 51 | Wet-process silica 2 | 0.8 | 6 |  | 1:9 | 1.2 | 4.2 | good | 10.23 |
| Comparative Example 4 | none | — | Wet-process silica 3 | 0.8 | 6 |  | 0:10 | 1.2 | 3.12 | failure | not measurable |
| Comparative Example 5 | Colloidal silica 2 | 10 | none | — | 6 | 30 | 10:0 | 1.2 | 0.45 | good | 2.73 |
| Example 16 | Colloidal silica 2 | 10 | Wet-process silica 1 | 0.3 | 6 |  | 9:1 | 1.2 | 0.8 | good | 3.33 |
| Example 17 | Colloidal silica 2 | 10 | Wet-process silica 1 | 0.3 | 6 |  | 7:3 | 1.2 | 1.11 | good | 3.47 |
| Example 18 | Colloidal silica 2 | 10 | Wet-process silica 1 | 0.3 | 6 |  | 5:5 | 1.2 | 1.22 | good | 3.41 |
| Example 19 | Colloidal silica 2 | 10 | Wet-process silica 1 | 0.3 | 6 |  | 3:7 | 1.2 | 1.29 | good | 3.62 |
| Example 20 | Colloidal silica 2 | 10 | Wet-process silica 1 | 0.3 | 6 |  | 1:9 | 1.2 | 1.33 | good | 4.09 |
| Comparative Example 2 | none | — | Wet-process silica 1 | 0.3 | 6 |  | 0:10 | 1.2 | 1.26 | failure | not measurable |
| Example 21 | Colloidal silica 1 64 Colloidal silica 3 22 | (51) 63 (112) | Wet-process silica 1 | 0.3 | 5.6 | 4.8 | 86:14 | 1.2 | 1.59 | good | 2.02 |

(4) Discussion

From the results shown in Tables 1 and 2, it can be found that when the colloidal silica and the wet-process silica particles were used in combination as in Examples 1 to 21, the polishing rate was significantly increased relative to those expected when silica particles of the respective types were used alone. In this regard, it is generally expected that the polishing rate which is expected when either the colloidal silica or the wet-process silica particles are used alone varies with a correlation mainly with the content of the wet-process silica particles. On the contrary, the results of Example 1 to 21 are remarkable ones that significantly exceed this expectation. This is thought to be because a mutually complementary relationship between the colloidal silica and the wet-process silica particles is brought about in terms of polishing performance and as a synergistic effect, improves the polishing rate. Specifically, it is thought that by adjusting the particle size of the wet-process silica particles and the particle size of the colloidal silica to be in a particular relationship as in the case of the present invention, the colloidal silica particles of small particle sizes are attached onto the surface of the wet-process silica particles of large particle sizes. Such wet-process silica particles having colloidal silica particles adhered on their surface is thought to have an improved polishing ability relative to when the wet-process silica particles are used alone.

In addition, the polishing compositions of Examples 1 to 21 also have an improved polishing performance in surface shape characteristics such as pits and surface roughness. Also in these cases, wet-process silica particles having colloidal silica particles adhered on their surface are thought to be generated, effects provided by the colloidal silica adhered onto the wet-process silica particles improve the polishing ability of the wet-process silica particles and at the same time, result in an improvement in the surface smoothness. As has been described above, it is thought that a mutually complementary relationship between both the colloidal silica and the wet-process silica particles is brought about also in terms of surface smoothness, and synergistic effects are exerted.

The polishing composition, according to various embodiments, can be used for polishing electronic components such as semiconductors and magnetic recording media including hard disks. Particularly, the polishing composition, according to various embodiments, can be used for surface polishing of a substrate for a magnetic recording medium, such as a glass magnetic disk substrate and an aluminum magnetic disk substrate. Further, the polishing composition, according to various embodiments, can be used for surface polishing of an aluminum magnetic disk substrate for a magnetic recording medium, the substrate having a coating formed by electroless nickel-phosphorus plating on the surface of a substrate of an aluminum alloy.

Although embodiments of the invention have been described in detail, it should be understood that various changes, substitutions, and alterations can be made hereupon without departing from the principle and scope of the embodiments of the invention. Accordingly, the scope of the embodiments of the invention should be determined by the following claims and their appropriate legal equivalents.

The invention claimed is:

1. A polishing composition, comprising:
    colloidal silica having an average particle size of 5 to 200 nm, and
    pulverized wet-process silica particles having an average particle size of 0.2 to 1.0 μm, wherein a ratio of the average particle size of the wet-process silica particles to that of the colloidal silica is from 2.0 to 16.0, wherein the composition is an aqueous composition further comprising an acid and an oxidizing agent, and has a pH value of 0.1 to 4.0, and wherein the composition is used for polishing an aluminum magnetic disk substrate that is plated with electroless nickel-phosphorus.

2. The polishing composition according to claim 1, wherein a total concentration of the colloidal silica and the wet-process silica particles is 1 to 50 mass %, and wherein the colloidal silica accounts for 5 to 95 mass % and the wet-process silica particles account for 5 to 95 mass %, of the whole of the colloidal silica and the wet-process silica particles.

3. A method for polishing a magnetic disk substrate, wherein the magnetic disk substrate is polished using the polishing composition according to claim 1.

* * * * *